(12) United States Patent
Maki

(10) Patent No.: US 11,675,480 B2
(45) Date of Patent: Jun. 13, 2023

(54) INFORMATION PROCESSING APPARATUS AND CONTROL METHOD

(71) Applicant: Lenovo (Singapore) Pte. Ltd., Singapore (SG)

(72) Inventor: Koutaroh Maki, Kanagawa (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 2 days.

(21) Appl. No.: 17/590,968

(22) Filed: Feb. 2, 2022

(65) Prior Publication Data

US 2022/0283677 A1  Sep. 8, 2022

(30) Foreign Application Priority Data

Mar. 2, 2021 (JP) .............................. JP2021-032466

(51) Int. Cl.
*G06F 3/0482* (2013.01)
*G06V 10/74* (2022.01)

(52) U.S. Cl.
CPC .......... *G06F 3/0482* (2013.01); *G06V 10/761* (2022.01)

(58) Field of Classification Search
CPC ............................ G06F 3/0482; G06V 10/761
See application file for complete search history.

(56) References Cited

U.S. PATENT DOCUMENTS

| 2011/0249074 A1* | 10/2011 | Cranfill | H04N 5/23293 |
| | | | 348/E7.083 |
| 2011/0268263 A1* | 11/2011 | Jones | H04M 3/563 |
| | | | 379/202.01 |
| 2015/0033149 A1* | 1/2015 | Kuchoor | H04N 21/4782 |
| | | | 715/753 |
| 2020/0097097 A1* | 3/2020 | Im | G06F 3/0487 |

FOREIGN PATENT DOCUMENTS

| JP | 2006-148730 A | 6/2006 |
| JP | 2019-061594 A | 4/2019 |

* cited by examiner

*Primary Examiner* — Cao H Nguyen
(74) *Attorney, Agent, or Firm* — Osha Bergman Watanabe & Burton LLP

(57) ABSTRACT

An information processing apparatus executes an application for transmitting and receiving video and voice to and from another information processing apparatus through a network, and includes a processor that: captures a screen area including at least a part of a picture among screen areas of a display in which the picture received from the other information processing apparatus using the application is displayed, as a still image file every predetermined time; and displays, on the display, at least a part of images of a series of captured still image files while continuing the capture every predetermined time during the running of the application.

12 Claims, 8 Drawing Sheets

| FILE NAME | TIME STAMP |
|---|---|
| 2020-11-02-18-54-22.png | 2020-11-02 18:54:22 |
| 2020-11-02-18-54-32.png | 2020-11-02 18:54:32 |
| 2020-11-02-18-54-42.png | 2020-11-02 18:54:42 |
| 2020-11-02-18-54-52.png | 2020-11-02 18:54:52 |
| 2020-11-02-18-55-02.png | 2020-11-02 18:55:02 |
| ⋮ | ⋮ |

| FILE NAME | TIME STAMP | EXCLUSION FLAG |
|---|---|---|
| 2020-11-02-18-54-22.png | 2020-11-02 18:54:22 | 0 |
| 2020-11-02-18-54-32.png | 2020-11-02 18:54:32 | 0 |
| 2020-11-02-18-54-42.png | 2020-11-02 18:54:42 | 1 |
| 2020-11-02-18-54-52.png | 2020-11-02 18:54:52 | 0 |
| 2020-11-02-18-55-02.png | 2020-11-02 18:55:02 | 1 |
| ⋮ | ⋮ | ⋮ |

INFORMATION PROCESSING APPARATUS AND CONTROL METHOD

CROSS-REFERENCE TO RELATED APPLICATION

This application claims priority to Japanese Patent Application No. 2021-32466, filed on Mar. 2, 2021, the entire content of which is herein incorporated by reference.

BACKGROUND

Technical Field

The present invention relates to an information processing apparatus and a control method.

Description of Related Art

There are applications used to perform an online video conference through a network. Among such applications that transmit and receive users' video and voice to and from information processing apparatuses used by respective users participating in a video conference, there is an application having a function to share the same material data in such a manner that the material data can be viewed on respective information processing apparatuses (for example, Japanese Unexamined Patent Application Publication No. 2019-061594).

In the application described above, there is a scene where a presenter makes a presentation to other participants while sharing a material. However, there is a case where a participant side may want to view a page before the material page currently displayed by the presenter when the presenter is making the presentation while turning pages of the material. For example, there is a case where the participant wants to check a little more the content of a previous page because the presenter speaks fast, wants to check the connection between the page currently displayed and the previous page, or wants to check a page again before asking a question. In such a case, since the participant cannot view, on his/her will, the page the participant wants to check, it is inconvenient.

SUMMARY

The present invention has been made in view of the above circumstances, and it is an object thereof to provide an information processing apparatus and a control method for improving the convenience of an online video conference.

The present invention has been made to solve the above problem, and an information processing apparatus according to the first aspect of the present invention is configured to execute an application for transmitting and receiving video and voice to and from any other information processing apparatus through a network, the information processing apparatus including: a capture unit (i.e., a processor) which captures a screen area including at least a part of pictures among screen areas of a display unit (i.e., a display), in which the pictures received from the other information processing apparatus using the application are displayed, as a still image file every predetermined time; and a display control unit (i.e., the processor) which displays, on the display unit, at least a part of images of a series of still image files captured by the capture unit while continuing the capture every predetermined time by the capture unit during the running of the application.

The above information processing apparatus may also be such that the display control unit displays, on the display unit, a user interface used to make each of the series of still image files captured by the capture unit selectable correspondingly in capture order, and displays, on the display unit, an image of a still image file selected according to an operation to the user interface.

The above information processing apparatus may further be such that the capture unit captures a full screen area of the display unit.

Further, the above information processing apparatus may be such that the capture unit captures a window area of the application in which the picture is displayed among the screen areas of the display unit.

Further, the above information processing apparatus may be such that the capture unit captures a part of an area specified from among the screen areas of the display unit.

The above information processing apparatus may further include an area detection unit (i.e., the processor) which detects a specific area from the picture by performing image analysis on the picture, wherein the capture unit captures the specific area detected by the area detection unit from among the screen areas of the display unit.

The above information processing apparatus may further include a similarity determination unit (i.e., the processor) which compares an image of a still image file captured this time with an image of a still image file previously captured each time the image is captured by the capture unit to determine a similarity, wherein the display control unit excludes, from display targets to be displayed on the display unit, an image of a still image file whose degree of similarity to the image of the still image file previously captured is determined by the similarity determination unit to be a predetermined threshold value or more.

The above information processing apparatus may further include a file generation unit which generates, as one data file, each of images of the series of still image files captured by the capture unit and allocated page by page in capture order, respectively.

The above information processing apparatus may further include a similarity determination unit which compares an image of a still image file captured this time with an image of a still image file previously captured each time the image is captured by the capture unit to determine a similarity, wherein the file generation unit generates, as one data file, images of remaining still image files after still image files whose degrees of similarity to the image of the still image file previously captured are determined by the similarity determination unit to be the predetermined threshold value or more are excluded from the series of still image files in a manner to be allocated page by page in capture order.

The above information processing apparatus may also be such that the file generation unit generates the one data file based on images of still image files captured by the capture unit while continuing the capture every predetermined time by the capture unit during the running of the application.

Further, the above information processing apparatus may be such that the capture unit starts the capture when it is detected that the application has occupied a microphone or a speaker.

Further, the above information processing apparatus may be such that the capture unit ends the capture when it is detected that the application has released the microphone or the speaker.

A control method according to the second aspect of the present invention is a control method for an information processing apparatus configured to execute an application for transmitting and receiving video and voice to and from any other information processing apparatus through a network, the control method including: a step of causing a capture unit to capture a screen area including at least a part of pictures among screen areas of a display unit, in which the pictures received from the other information processing apparatus using the application are displayed, as a still image file every predetermined time; and a step of causing a display control unit to display, on the display unit, at least a part of images of a series of still image files captured by the capture unit while continuing the capture every predetermined time by the capture unit during the running of the application.

The above-described aspects of the present invention can improve the convenience of an online video conference.

DETAILED DESCRIPTION

Embodiments of the present invention will be described in detail below with reference to the accompanying drawings.

First Embodiment

First, the outline of an information processing apparatus according to this embodiment will be described.

Figure 1:
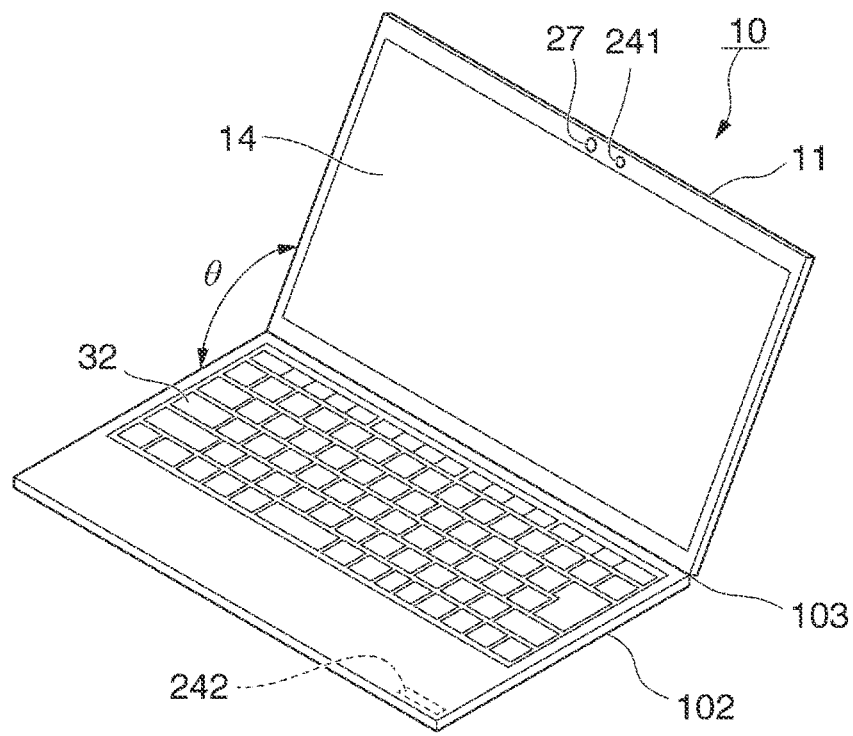
FIG. 1 is a perspective view illustrating the appearance of an information processing apparatus according to a first embodiment.

FIG. 1 is a perspective view illustrating the appearance of the information processing apparatus according to the present embodiment. An information processing apparatus 10 illustrated is a clamshell laptop PC (Personal Computer). The information processing apparatus 10 includes a first chassis 101, a second chassis 102, and a hinge mechanism 103. The first chassis 101 and the second chassis 102 are chassis having a substantially rectangular plate shape (for example, a flat plate shape). One of the sides of the first chassis 101 and one of the sides of the second chassis 102 are joined (coupled) through the hinge mechanism 103 in such a manner that the first chassis 101 and the second chassis 102 are rotatable relative to each other around the rotation axis of the hinge mechanism 103. A state where an open angle θ between the first chassis 101 and the second chassis 102 around the rotation axis is substantially 0° is a state where the first chassis 101 and the second chassis 102 are closed in such a manner as to overlap each other (called a "closed state"). Surfaces of the first chassis 101 and the second chassis 102 on the sides to face each other in the closed state are called "inner surfaces," and surfaces on the other sides of the inner surfaces are called "outer surfaces," respectively. The open angle θ can also be called an angle between the inner surface of the first chassis 101 and the inner surface of the second chassis 102. As opposed to the closed state, a state where the first chassis 101 and the second chassis 102 are open is called an "open state." The open state is a state where the first chassis 101 and the second chassis 102 are rotated relative to each other until the open angle θ exceeds a preset threshold value (for example, 10°).

A display unit (or a display) 14 is provided on the inner surface of the first chassis 101. The display unit 14 displays pictures based on processing executed on the information processing apparatus 10. Further, an imaging unit 27 (camera) and a microphone 241 are provided in a peripheral area of the display unit 14 on the inner surface of the first chassis 101. In other words, the imaging unit 27 and the microphone 241 are provided in positions to face a user who uses the information processing apparatus 10. Note that the microphone 241 may be provided to be divided into two microphones for the right and left sides, respectively.

Further, a keyboard 32 as an input device to accept user's input and a speaker 242 as an output device are provided on the inner surface of the second chassis 102. Note that the speaker 242 may also be provided to be divided into two speakers for the right and left sides, respectively. In the closed state, the display unit 14 is not visible and any operation on the keyboard 32 is disabled. On the other hand, in the open state, the display unit 14 is visible and any operation on the keyboard 32 is enabled (that is, the information processing apparatus 10 is available).

The information processing apparatus 10 can execute various application programs. For example, the information processing apparatus 10 executes application programs using pictures captured by the imaging unit 27 and voice input to the microphone 241. As an example, there is an application for multiple users respectively using terminal devices to bidirectionally communicate video and voice, which is used for a video conference or the like. The application that can be used for such a video conference is called a "video conference app" below. The information processing apparatus 10 can be used as a terminal device by executing the video conference app when conducting a video conference with other users using the video conference app.

When a user uses the video conference app by using the information processing apparatus 10, the imaging unit 27 captures a video including the user (video conference participant) facing the display unit 14 and the like. Further, voice uttered by the user and the like are input to the microphone 241. Based on processing of the video conference app, the information processing apparatus 10 transmits the video captured by the imaging unit 27 and the voice input to the microphone 241 to terminal devices of other users who participating in the video conference through a network. Further, the information processing apparatus 10 acquires captured video and voice from the other terminal devices of the other users to display the acquired video on the display unit 14 and output the acquired voice from the speaker 242 or the like. Thus, respective users participating in the video conference can use the video conference app to talk to one another while watching the video of the users.

Further, there is a video conference app having a function to share the same material data to be able to be viewed on the respective terminal devices. There is a scene where a presenter makes a presentation to other participants while sharing a material using this function. However, there is a case where a participant side may want to view a page before the material page currently displayed by the presenter when the presenter is making the presentation while turning pages.

Therefore, the information processing apparatus 10 according to the present embodiment uses the video conference app to capture a screen area including at least a part of pictures received from any other terminal device of any other user as a still image file every predetermined time. Then, the information processing apparatus 10 can display at least some images among a series of captured still image files while continuing the capture every predetermined time during the running of the video conference app. Thus, when the user wants to view a page before the material page currently displayed, the information processing apparatus 10 allows the user to arbitrarily select and display a captured image from among captured images. In the following, the captured image is called the "capture image" and the captured still image file is called the "capture image file."

The function of capturing a picture of this video conference app and the function of displaying the capture image are implemented, for example, by executing an application (hereinafter called "review app") different from the video conference app. Thus, the review app can be used without limiting the target application.

Figure 2:
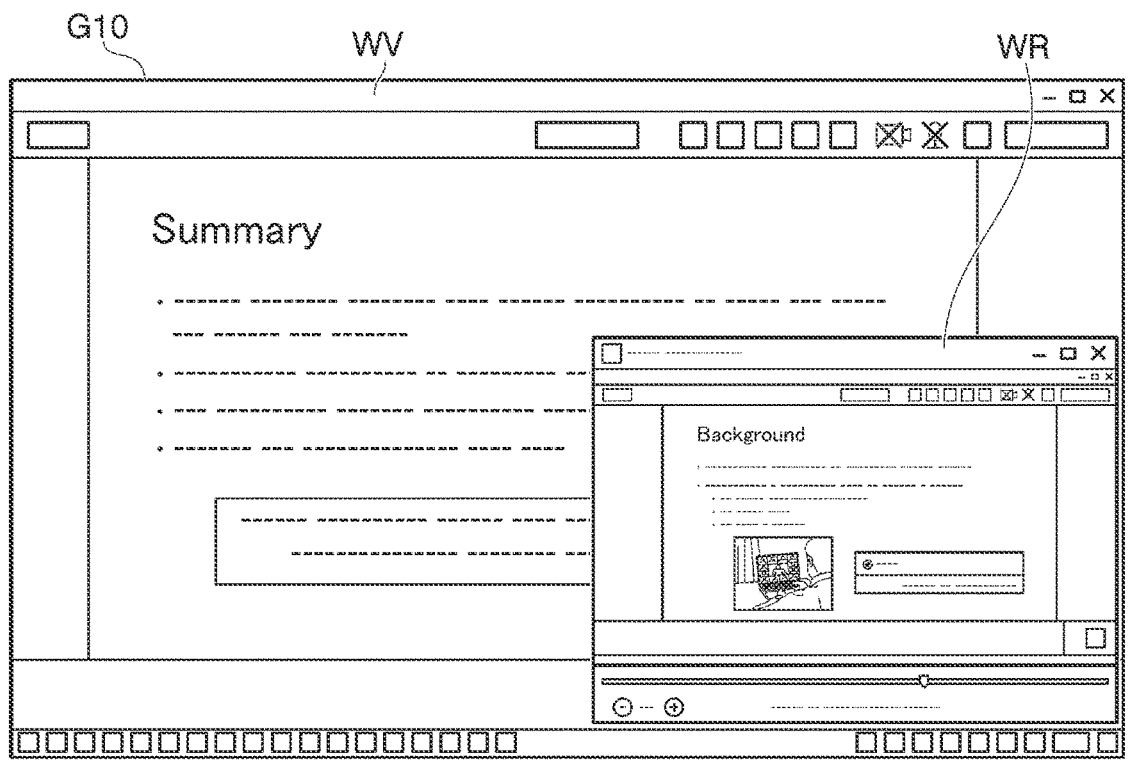
FIG. 2 is a diagram illustrating a display example of a review app according to the first embodiment.
Figure 3:
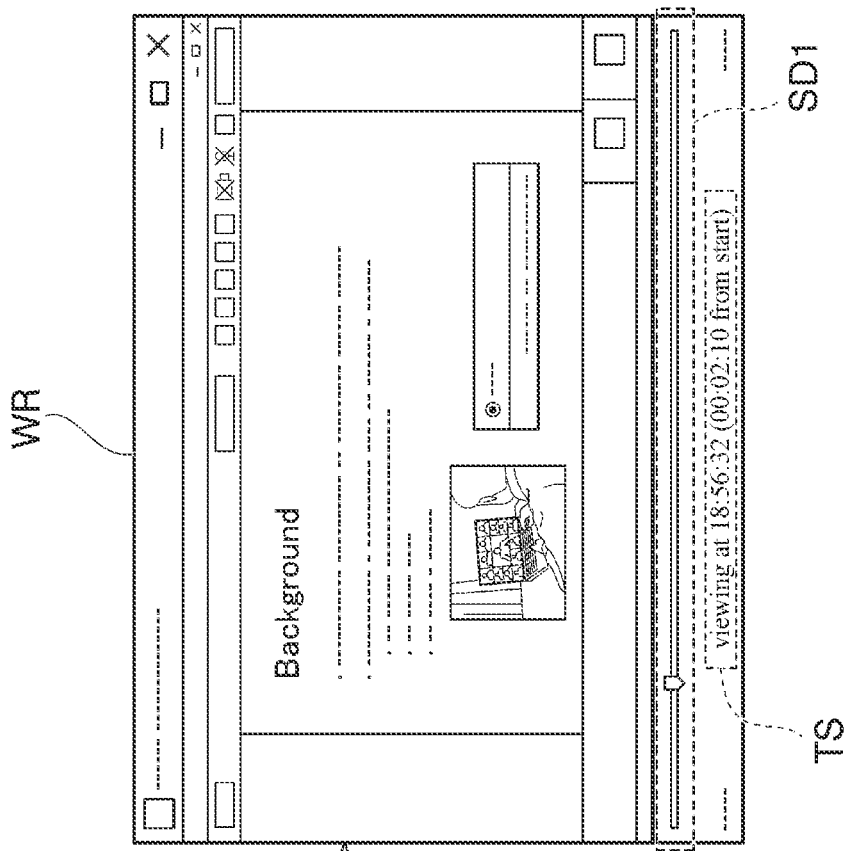
FIG. 3 is an explanatory diagram of capture images and the display of a capture image by the review app according to the first embodiment.
Figure 3:
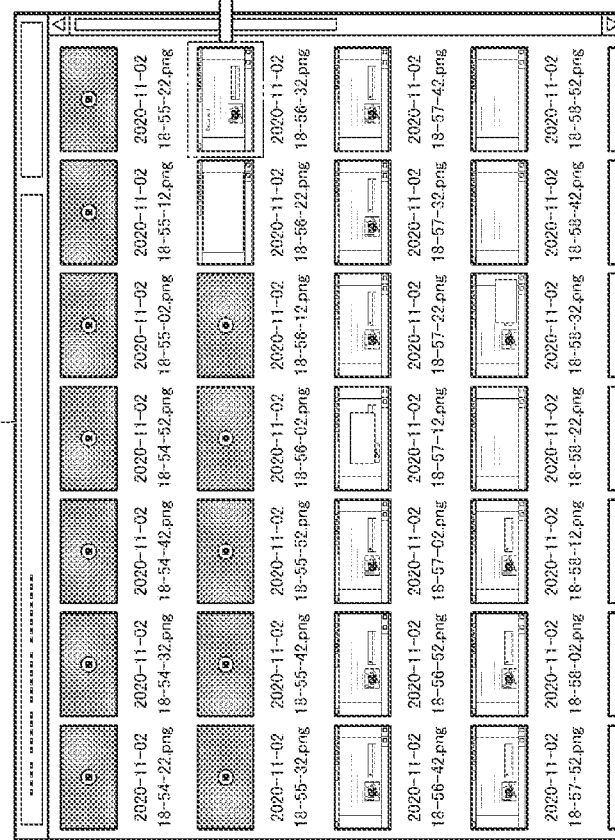

Referring to FIG. 2 and FIG. 3, the outline of the review app will be described.

FIG. 2 is a diagram illustrating a display example of the review app according to the present embodiment. A display screen G10 represents a full screen area of the display unit 14 of the information processing apparatus 10. A window WV of the video conference app is full-screen displayed on the display screen G10. In the window WV of the video conference app, the other users participating in the video conference, a shared material, and the like can be displayed. In the illustrated example, the current page of the shared material is displayed. Further, a window WR of the review app is displayed on the display screen G10 in such a manner as to be superimposed on the window WV of the video conference app. In the window WR of the review app, a capture image displayed in the window WV of the video conference app in the past. The window WR of the review app is an active window but is displayed in a size smaller than the window WV of the video conference app. Therefore, the user can display and check any capture image in the window WR of the review app during the video conference while viewing the window WV of the video conference app.

FIG. 3 is an explanatory diagram of capture images by the review app and the display thereof according to the present embodiment. FIG. 3 illustrates a window WF, in which files in a holder with capture image files stored therein are displayed, and the window WR of the review app illustrated in FIG. 2. In the folder mentioned above, capture image files captured every predetermined time (for example, every 10 seconds) are stored in capture order. The file name of each capture image file is generated, for example, based on the time of each capture image. The folder may also be created every capture period from the start to the end of one capture by the review app.

A slider SD1 is displayed as an operation UI (User Interface) to allow the user to select a capture image to be displayed in the window WR of the review app. The capture images correspond from the left end to the right end of the slider SD1 in capture order. As the slider SD1 is moved more to the left, a capture image captured earlier is displayed, while as the slider SD1 is moved more to the right, a capture image captured later is displayed. When the slider SD1 is moved to the left end, a capture image first captured is displayed, while when the slider SD1 is moved to the right end, a capture image last captured at that point is displayed. For example, in a case where nine capture image files are stored, the first capture image is displayed when the slider SD1 is moved to the left end, the fifth capture image is displayed when the slider SD1 is moved to the center, and the ninth capture image is displayed when the slider SD1 is moved to the right end. The length of the slider bar of the slider SD1 is divided evenly by the number of stored capture images, and a capture image corresponding to the position of the slider SD1 is displayed. When the tenth capture image is stored over time, the state where the length of the slider bar of the slider SD1 is divided evenly by nine is changed to a state where the length of the slider bar of the slider SD1 is divided evenly by ten. In this case, when the slider SD1 is moved to the right end, the tenth capture image is displayed. In a time display TS, time information of a capture image currently displayed in the window WR of the review app is displayed. For example, in the time display TS, either one or both of the time when the capture image currently displayed was captured and the elapsed time from the start of the capture are displayed.

Thus, when the presenter is making a presentation while sharing a material with other participants at the video conference, the information processing apparatus 10 allows each participant to display and check a material page displayed earlier by any length of time than the material page currently displayed by the presenter. The configuration of the information processing apparatus 10 according to the present embodiment will be described in detail below.

[Hardware Configuration of Information Processing Apparatus 10]

Figure 4:
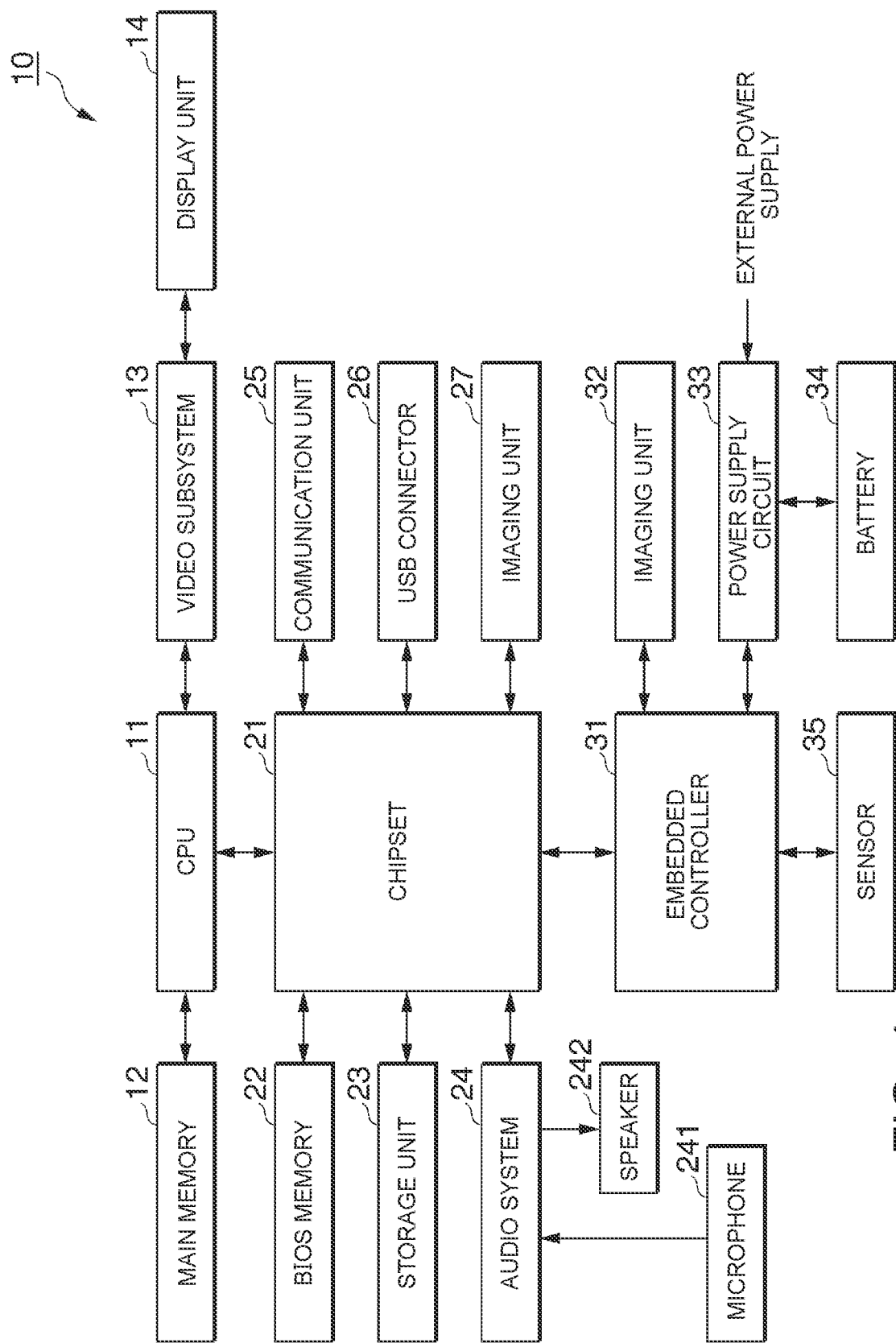
FIG. 4 is a block diagram illustrating an example of the hardware configuration of the information processing apparatus according to the first embodiment.

Referring first to FIG. 4, the main hardware configuration of the information processing apparatus 10 will be described. FIG. 4 is a block diagram illustrating an example of the hardware configuration of the information processing apparatus 10 according to the present embodiment.

The information processing apparatus 10 includes a CPU 11, a main memory 12, a video subsystem 13, the display unit 14, a chipset 21, a BIOS memory 22, a storage unit 23, an audio system 24, a communication unit 25, a USB connector 26, the imaging unit 27, an embedded controller 31, the keyboard 32, a power supply circuit 33, a battery 34, and a sensor 35.

The CPU 11 executes various kinds of arithmetic processing by program control to control the entire information processing apparatus 10. For example, the CPU 11 executes processing based on an OS (Operating System) and a BIOS program. Further, the CPU 11 executes processing based on various drivers, various services/utilities, applications, and the like executed on the OS.

The main memory 12 is a writable memory used as reading areas of execution programs of the CPU 11 or working areas to which processing data of the execution programs are written. The main memory 12 is configured, for example, to include plural DRAM (Dynamic Random Access Memory) chips. The execution programs include the OS, various drivers for hardware-operating peripheral devices, various services/utilities, application programs, and the like.

The video subsystem 13 is a subsystem for realizing a function related to image display, which includes a video controller. This video controller processes a drawing command from the CPU 11, writes processed drawing information into a video memory, and reads this drawing information from the video memory and outputs it to the display unit 14 as drawing data (display data).

The display unit 14 is, for example, a liquid crystal display or an organic EL display to display a display screen based on the drawing data (display data) output from the video subsystem 13.

The chipset 21 includes controllers, such as USB (Universal Serial Bus), serial ATA (AT Attachment), an SPI (Serial Peripheral Interface) bus, a PCI (Peripheral Component Interconnect) bus, a PCI-Express bus, and an LPC (Low Pin Count) bus, and plural devices are connected to the chipset 21. For example, the BIOS memory 22, the storage unit 23, the audio system 24, the communication unit 25, the USB connector 26, and the embedded controller 31 are included as the plural devices.

The BIOS memory 22 is configured, for example, by an electrically rewritable nonvolatile memory such as an EEPROM (Electrically Erasable Programmable Read Only Memory) or a flash ROM. The BIOS memory 22 stores a BIOS and system firmware for controlling the embedded controller 31 and the like.

The storage unit 23 is configured to include an HDD (Hard Disk Drive) or an SSD (Solid State Drive), and the like. For example, the storage unit 23 stores the OS, various drivers, various services/utilities, application programs, and various data.

The microphone 241 and the speaker 242 are connected to the audio system 24 to record, play back, and output sound data. For example, the microphone 241 and the speaker 242 are built in the information processing apparatus 10. Note that the microphone 241 and the speaker 242 may also be peripheral devices connected to the information processing apparatus 10 by using a near field communication such as Bluetooth (registered trademark) or USB.

The communication unit 25 is connected to a network through wireless LAN (Local Area Network) or wired LAN to perform data communication. For example, when receiving data from the network, the communication unit 25 generates an event trigger indicating that the data has been received. The communication unit 25 may also communicate with peripheral devices by using the near field communication such as Bluetooth (registered trademark).

The USB connector 26 is a connector for connecting peripheral devices using the USB.

The imaging unit 27 is configured to include a lens and an image sensor, which are not illustrated, to capture a subject image input through the lens and output captured data changed to an electric signal. For example, the imaging unit 27 captures a predetermined range (angle of view) in a direction to face the display unit 14 and outputs the captured image data. As an example, when the user is using the video conference app, captured image data of the user existing in the position to face the display unit 14 is output.

The keyboard 32 is an input device on which multiple keys (an example of operators) to accept user operations are arranged. As illustrated in FIG. 1, the keyboard 32 is provided on the inner surface of the second chassis 102. The keyboard 32 outputs, to the embedded controller 31, input information input with user operations (for example, an operation signal indicative of a key(s) operated on the keyboard).

The power supply circuit 33 includes, for example, a DC/DC converter, a charge/discharge unit, an AC/DC adapter, and the like. For example, the power supply circuit 33 converts DC voltage supplied from an external power supply through the AC/DC adapter or supplied from the battery 34 into plural voltages required to operate the information processing apparatus 10. Further, the power supply circuit 33 supplies power to each unit of the information processing apparatus 10 under the control of the embedded controller 31.

The battery 34 is, for example, a lithium battery, which is charged through the power supply circuit 33 when power is supplied from the external power supply to the information processing apparatus 10, and outputs the charged power through the power supply circuit 33 as operating power of the information processing apparatus 10 when power is not supplied from the external power supply to the information processing apparatus 10.

The sensor 35 is configured to include various sensors, such as a Hall sensor, an acceleration sensor, and/or a temperature sensor. Each of the various sensors is placed for each detection target to output a detection signal, respectively. For example, the Hall sensor is used to detect whether the information processing apparatus 10 is in the open state or the closed state. Further, the acceleration sensor is used to detect the orientation and movement of the information processing apparatus 10 or to detect the open angle θ between the first chassis 101 and the second chassis 102. Further, the temperature sensor is used to detect the internal temperature of the information processing apparatus 10.

The embedded controller 31 is a one-chip microcomputer which monitors and controls various devices (peripheral devices, sensors, and the like) regardless of the system state of the information processing apparatus 10. The embedded controller 31 includes, a CPU, a ROM, a RAM, multi-channel A/D input terminal and D/A output terminal, a timer, and digital input/output terminals, which are not illustrated. To the digital input/output terminals of the embedded controller 31, for example, the keyboard 32, the power supply circuit 33, the sensor 35, and the like are connected. The embedded controller 31 receives input information (operation signal) from the keyboard 32 and a sensor signal from the sensor 35, and the like. Further, the embedded controller 31 controls the operation of the power supply circuit 33 and the like.

[Functional Configuration of Information Processing Apparatus 10]

Next, the functional configuration realized by the information processing apparatus 10 executing the above-described video conference app and review app will be described.

Figures 5, 6:
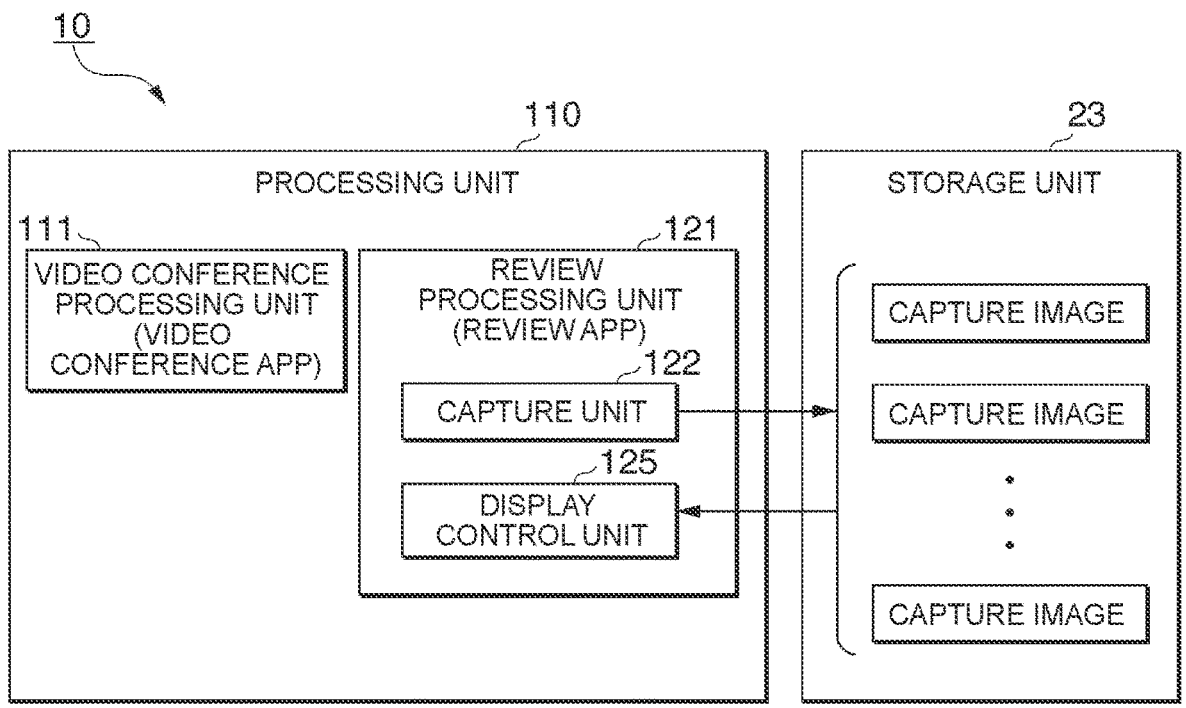
FIG. 5 is a block diagram illustrating an example of the functional configuration of the information processing apparatus according to the first embodiment.
FIG. 6 is a table illustrating an example of capture image files according to the first embodiment.

FIG. 5 is a block diagram illustrating an example of the functional configuration of the information processing apparatus 10 according to the present embodiment. The information processing apparatus 10 includes a processing unit (or a processor) 110 as a functional component implemented by the CPU 11 executing various programs. The processing unit 110 includes a video conference processing unit 111 and a review processing unit 121. The video conference processing unit 111 is a functional component implemented by executing the video conference app. The review processing unit 121 is a functional component implemented by executing the review app. Here, the review processing unit 121 will be described in detail. The review processing unit 121 includes a capture unit 122 and a display control unit 125.

The capture unit 122 captures a screen area including at least part of pictures among screen areas of the display unit 14, in which the pictures received from any other terminal device (information processing apparatus) by the video conference processing unit 111 are displayed, as a still image file every predetermined time. As an example, the capture unit 122 captures the screen area every 10 seconds and stores the captured screen area sequentially in the storage unit 23 as a capture image file.

FIG. 6 is a table illustrating an example of capture image files stored in the storage unit 23. Each capture image is stored as a still image file each time it is captured. For example, as a file name, a name based on the time of being captured is given. Note that the file names may also be names numbered in ascending order such as 001, 002, 003, . . . in capture order. As the file format, PNG is taken here as an example, but the present invention is not limited to this example, and any other file format such as GIF, JPEG, or BMP may also be used. Further, time information (time stamp) indicative of the time of being captured is included in each capture image file.

A screen area captured by the capture unit 122 may be the full screen area (the entire area of the desktop screen) of the display unit 14, or may be the window area of the video conference app (the area of the window WV illustrated in FIG. 2 and FIG. 3). Further, the screen area captured by the capture unit 122 may be a screen area specified by the user. For example, the size and position of an area to be captured may be settable by the user in a manner to include at least a part of pictures (material) of the video conference app before the start of capture or in the middle of capture.

Note that it may be preset whether the screen area to be captured by the capture unit 122 is the full screen area (the entire area of the desktop screen) of the display unit 14, the window area of the video conference app, or an area specified by the user, or the screen area to be captured by the capture unit 122 may be set or changed by the user before the start of capture.

Here, when the entire area of the desktop screen is set as the screen area to be captured, the window area of the review app (the area of the window WR illustrated in FIG. 2 and FIG. 3) can be set to be excluded from capture targets. Further, when the window area of the video conference app is set as the screen area to be captured, a picture displayed in the window area of the video conference app can be captured even if the window of the video conference app is hidden by a window of any other application.

Further, the user may be able to preset whether or not a UI (a mouse pointer, a mouse cursor, or the like) indicative of the current operating position displayed on the display screen of the display unit 14 is targeted for capture.

Further, for example, the capture unit 122 starts or ends the capture according to a user operation. As an example, an operation UI used to start or end the capture may be displayed in the window WR illustrated in FIG. 2 and FIG. 3. Then, based on a user operation to this operation UI, the capture unit 122 may start or end the capture.

Further, the capture unit 122 may start or end the capture by automatically detecting the start or the end of the video conference. For example, when it is detected that the video conference app has occupied the microphone 241 or the speaker 242, the capture unit 122 may start the capture.

Here, the state where the video conference app has occupied the microphone 241 is a state where the video conference app is allowed to use the microphone 241, and more specifically, a state where the right to use (exclusive right to use) the microphone 241 is granted to the video conference app by the OS. For example, the state where the microphone 241 has been occupied does not mean a state where the function of the microphone 241 on the video conference app is temporarily switched from OFF to ON by the user performing input operations to mute and unmute the microphone 241 during the video conference using the video conference app. Further, the state where the video conference app has occupied the speaker 242 is a state where the video conference app is allowed to use the speaker 242, and more specifically, a state where the right to use (exclusive right to use) the speaker 242 is granted to the video conference app by the OS.

Further, when it is detected that the microphone 241 or the speaker 242 occupied by the video conference app has been released, the capture unit 122 may end the capture.

Here, the state where the video conference app has released the microphone 241 is a state where the video conference app has released the right to use the microphone 241 and, more specifically, a state where the right to use the microphone 241 granted to the video conference app by the OS has been released. For example, the state where the microphone 241 has been released does not mean a state where the function of the microphone 241 on the video conference app is temporarily switched from ON to OFF by the user performing input operations to mute and unmute the microphone 241 during the video conference using the video conference app. Further, the state where the video conference app has released the speaker 242 is a state where the video conference app has released the right to use the speaker 242 and, more specifically, a state where the right to use the speaker 242 granted to the video conference app by the OS has been released.

Returning to FIG. 5, the display control unit 125 displays, on the display unit 14, images of a series of capture image files captured by the capture unit 122 while continuing the capture every predetermined time by the capture unit 122 during the running of the video conference app. Specifically, the display control unit 125 reads a capture image file stored in the storage unit 23. Then, the display control unit 125 displays a capture image of the read capture image file in the window WR of the review app illustrated in FIG. 2 and FIG. 3.

For example, the display control unit 125 displays, on the display unit 14, the slider SD1 used to make each of the series of capture image files captured by the capture unit 122 selectable in capture order, respectively. Then, the display control unit 125 displays, on the display unit 14 (in the window WR), an image of a capture image file selected according to a user operation to the slider SD1 (see FIG. 3).

[Review Processing]

Figure 7:
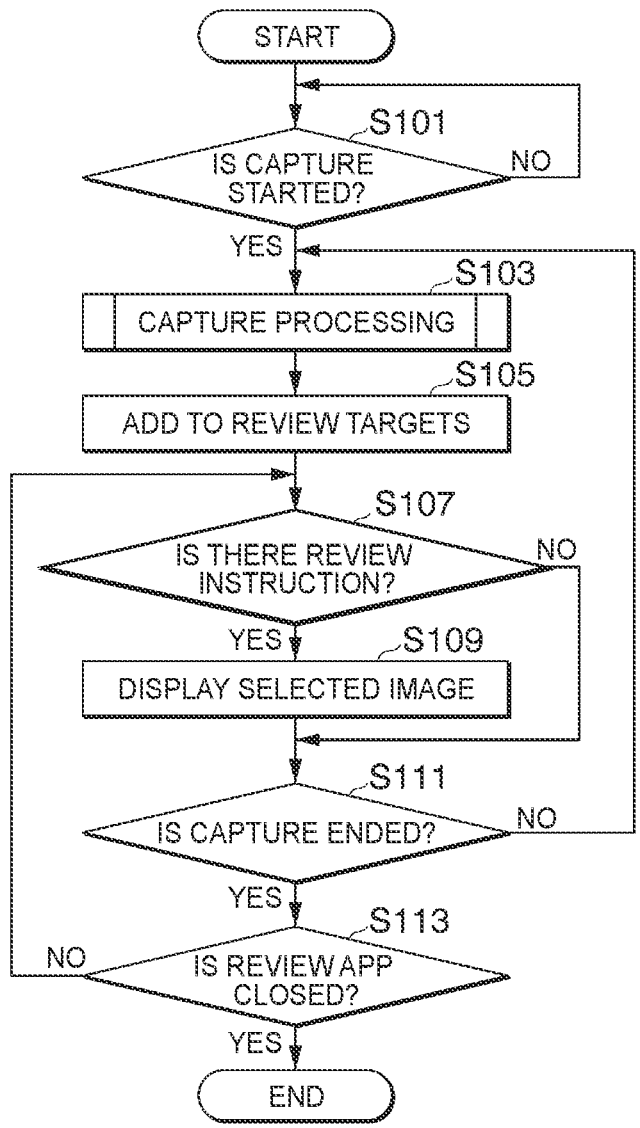
FIG. 7 is a flowchart illustrating an example of review processing according to the first embodiment.
Figure 8:
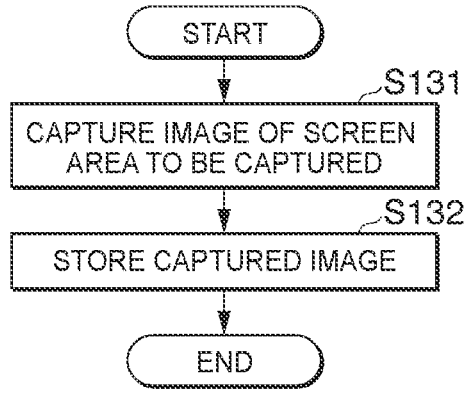
FIG. 8 is a flowchart illustrating an example of capture processing according to the first embodiment.

Referring next to FIG. 7 and FIG. 8, the operation of review processing executed by the review processing unit 121 of the information processing apparatus 10 will be described.

FIG. 7 is a flowchart illustrating an example of review processing according to the present embodiment. The illustrated review processing is started, for example, with the startup of the review app.

(Step S101) The review processing unit 121 determines whether to start capture or not. For example, when an operation to start capture is performed by the user, or when it is detected that the video conference app has occupied the microphone 241 or the speaker 242, the review processing unit 121 determines that a capture start event occurs (YES), and proceeds to a process in step S103. On the other hand, when determining that no capture start event occurs (NO), the review processing unit 121 continues the process in step S101.

(Step S103) The review processing unit 121 executes capture processing every predetermined time (for example, every 10 seconds). Referring here to FIG. 8, the capture processing will be described. FIG. 8 is a flowchart illustrating an example of capture processing according to the present embodiment.

(Step S131) The review processing unit 121 captures an image of a screen area to be captured among the screen areas of the display unit 14. The screen area to be captured is either one of the full screen area (the entire area of the desktop screen) of the display unit 14, the window area of the video conference app (the area of the window WV illustrated in FIG. 2), and a screen area specified by the user. The user may also select either one of the screen areas.

(Step S132) The review processing unit 121 stores, in the storage unit 23, an image file (capture image file) captured in step S131. Then, the review processing unit 121 proceeds to a process in step S105 of FIG. 7.

(Step S105) The review processing unit 121 adds the capture image stored in the storage unit 23 to review targets.

(Step S107) The review processing unit 121 determines whether or not there is a review instruction to display the capture image with a user operation. When determining that there is the review instruction (YES), the review processing unit 121 proceeds to a process in step S109. On the other hand, when determining that there is no review instruction (NO), the review processing unit 121 proceeds to a process in step S111.

(Step S109) The review processing unit 121 displays, on the display unit 14 (in the window WR of the review app illustrated in FIG. 2 and FIG. 3), the capture image selected with a user operation as the review instruction. The operation in which the user selects the capture image as the review instruction is, for example, an operation to the slider SD1 illustrated in FIG. 3.

(Step S111) The review processing unit 121 determines whether or not to end the capture. For example, when such an operation to end the capture is performed by the user, or when it is detected that the video conference app has released the microphone 241 or the speaker 242, the review processing unit 121 determines that a capture end event occurs (YES), and proceeds to a process in step S113 without continuing the capture processing (by ending the capture processing). On the other hand, when determining that no capture end event occurs (NO), the review processing unit 121 returns to step S103 to continue the capture processing every predetermined time.

(Step S113) The review processing unit 121 determines whether or not an operation to close the review app is performed by the user. When determining that the operation to close the review app is not performed by the user (NO), the review processing unit 121 returns to the process in step S107 to display the capture image according to the review instruction. On the other hand, when determining that the operation to close the review app is performed (YES), the review processing unit 121 closes the review app and ends the review processing.

When determining in step S111 that the capture end event occurs (YES), the review processing unit 121 may close the review app to end the review processing with the end of the capture processing.

As described above, the information processing apparatus 10 according to the present embodiment executes the video conference app (an example of an application) to transmit and receive video and voice to and from any other terminal device (information processing apparatus) through the network. The information processing apparatus 10 captures a screen area including at least a part of pictures among screen areas of the display unit 14, in which the pictures received from any other terminal device using the video conference app are displayed, as a still image file (capture image file) every predetermined time. Further, the information processing apparatus 10 displays, on the display unit 14, at least a part of images of a captured series of capture image files while continuing the capture every predetermined time during the running of the video conference app.

Thus, the information processing apparatus 10 allows a user to review a conference material(s) while participating in the conference in progress. For example, since the information processing apparatus 10 allows the user (participant) to review, on his/her will, a material shared by another user (presenter) at the conference in the progress of the online video conference, the convenience of the online video conference can be improved. At this time, since the information processing apparatus 10 provides a review display only on the own display unit 14 using a capture image stored therein, the user (participant) can review the material without caring about the presenter and the other participants.

For example, the information processing apparatus 10 displays, on the display unit 14, the slider SD1 (an example of a user interface) used to make each of the captured series of capture image files selectable correspondingly in capture order, and displays, on the display unit 14, an image of a capture image file selected according to an operation to the slider SD1.

Thus, the info nation processing apparatus 10 allows the user (participant) to select, with an easy operation, a page the user wants to review in the material shared by the other user (presenter) at the conference.

As an example, the information processing apparatus 10 may capture the full screen area (the entire area of desktop screen) of the display unit 14.

Thus, the information processing apparatus 10 allows the user (participant) to review the material shared by the other user (presenter) at the conference using the capture image of the entire area of the desktop screen in the progress of the online video conference.

Note that, when the entire area of the desktop screen is set as the screen area to be captured, the information processing apparatus 10 can set the window area of the review app (the area of the window WR illustrated in FIG. 2 and FIG. 3) to be excluded from capture targets. Thus, the information processing apparatus 10 does not capture the window area of the review app in the progress of the online video conference even when the entire area of the desktop screen is set as the screen area to be captured.

Further, as another example, the information processing apparatus 10 may capture an area of the window WV of the video conference app, in which a picture received from any other terminal device using the video conference app is displayed, among the screen areas of the display unit 14.

Thus, the information processing apparatus 10 allows the user (participant) to review the material shared by the other user (presenter) at the conference by using the capture image of the window area of the video conference app in the progress of the online video conference. Further, since the information processing apparatus 10 can capture a picture displayed in the window area of the video conference app even if the window WV of the video conference app is hidden by a window of any other application, the user (participant) can review the picture later.

Further, as still another example, the information processing apparatus 10 may capture a partial area specified from among the screen areas of the display unit 14.

Thus, the information processing apparatus 10 allows the user (participant) to review the material shared by the other user (presenter) at the conference by using the capture image of the screen area specified by the user (participant) in the progress of the online video conference.

Further, the information processing apparatus 10 may start the capture when it is detected that the video conference app has occupied the microphone 241 or the speaker 242.

Thus, since the information processing apparatus 10 automatically captures a picture of the video conference app without any operation by the user (participant), it can be prevented that the user (participant) cannot review the picture due to forgetting to capture the picture.

Further, the information processing apparatus 10 may end the capture when it is detected that the video conference app has released the microphone 241 or the speaker 242.

Thus, since the information processing apparatus 10 automatically ends the capture when the video conference ends without any operation by the user (participant), it can be prevented that unnecessary capture images are stored after the end of the video conference, and this can suppress the amount of data.

Further, a control method for the information processing apparatus 10 according to the present embodiment includes: a step of capturing a screen area including at least a part of pictures among screen areas of the display unit 14, in which the pictures received from any other terminal device using the video conference app are displayed, as a still image file (capture image file) every predetermined time; and a step of displaying, on the display unit 14, at least a part of images among a captured series of capture image files while continuing the capture every predetermined time during the running of the video conference app.

Thus, the information processing apparatus 10 allows a user to review a conference material(s) while participating in the conference in progress. For example, since the information processing apparatus 10 allows a user (participant) to review, on his/her will, a material shared by another user (presenter) at the conference in the progress of the online video conference, the convenience of the online video conference can be improved. At this time, since the information processing apparatus 10 provides a review display only on the own display unit 14 using a capture image stored therein, the user (participant) can review the material without caring about the presenter and the other participants.

Second Embodiment

Next, a second embodiment of the present invention will be described.

In this embodiment, a configuration to generate a material data file automatically based on a capture image captured by the video conference app described in the first embodiment will be described. Specifically, a review app according to the present embodiment cuts out and captures a content area of a material from a picture of the video conference app to generate a material file with similar capture images excluded therefrom. The content area is an area of a content part of the material in the picture displayed in the window WV of the video conference app.

First, the cut-out of the content area will be described.

Figure 9:
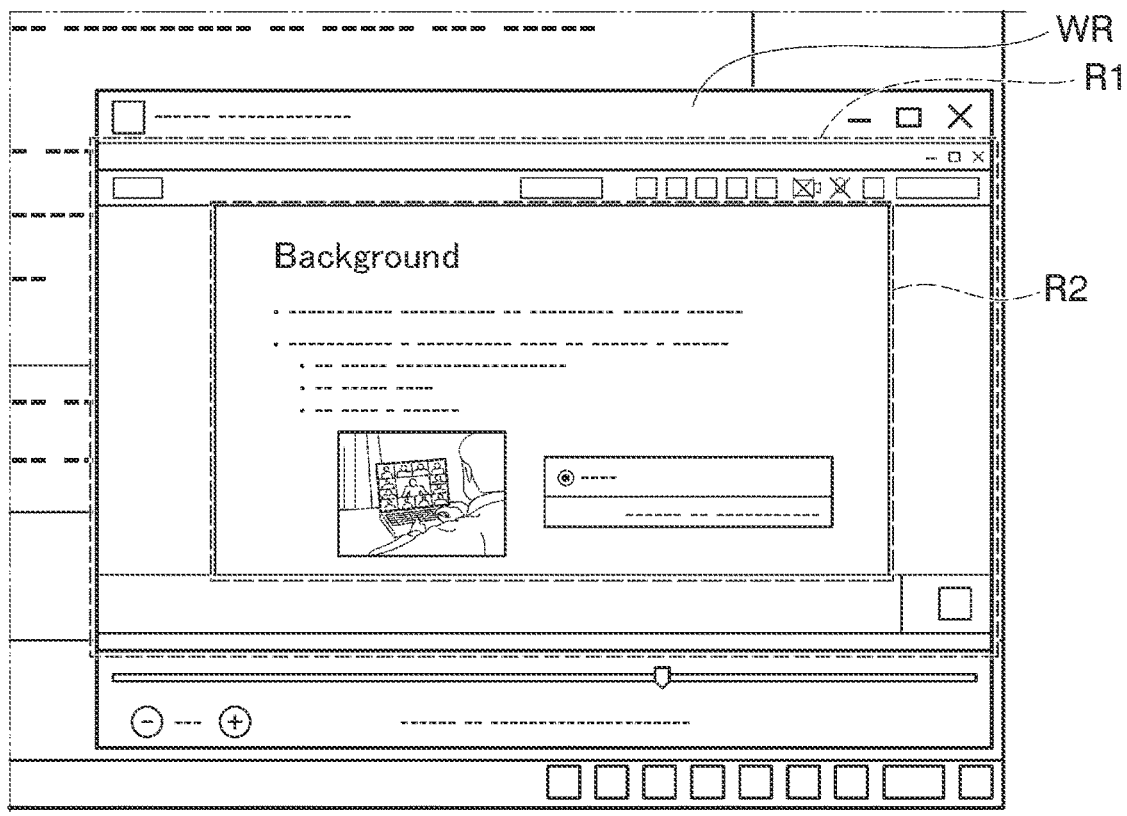
FIG. 9 is an explanatory diagram about the cut-out of a content area according to a second embodiment.

FIG. 9 is an explanatory diagram about the cut-out of the content area according to the present embodiment. In FIG. 9, the part of the window WR of the review app illustrated in FIG. 2 is illustrated. In an area R1 of the window WR, a capture image obtained by capturing an area of the window WV of the video conference app is displayed. A material content area R2 among capture images is an area smaller than the area R1 of the window WR. Therefore, in the present embodiment, the content area R2 is cut out and captured from the picture of the video conference app by performing image analysis. A capture image of the cut-out content area R2 is displayed over the entire area R1 so as not to display parts unnecessary for the material. Although the display size of the window WR becomes small when a user views both the window WV of the video conference app and the window WR of the review app, the window area of the window WR can be used effectively to make it easier to view the material.

Figure 10:
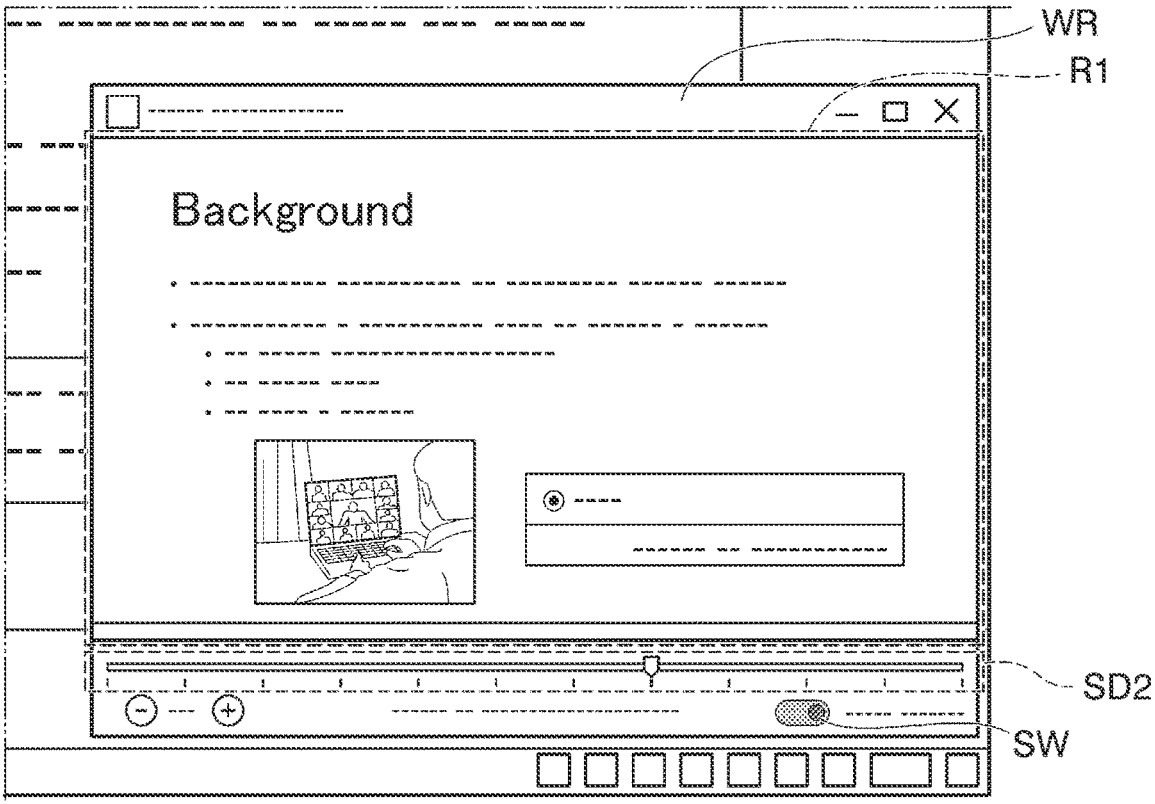
FIG. 10 is a diagram illustrating a display example of a cut-out capture image according to the second embodiment.

FIG. 10 is a diagram illustrating a display example of a cut-out capture image according to the present embodiment. In the area R1 of the window WR of the review app, a capture image of a material content area cut out from a picture displayed in the window WV of the video conference app is displayed. Further, in the present embodiment, capture images similar to the already stored capture images are excluded from review targets by performing image analysis on the capture image in the content area. In other words, only one capture image becomes a review target for one page. Thus, in the present embodiment, it can be avoided that a capture image on the same page of the material is duplicated, and only one capture image can be extracted for one page as a review target.

Further, in the window WR of the review app illustrated in FIG. 10, a switch SW to switch whether or not a mode to extract only one capture image for one page as a review target (hereinafter called "extraction review mode") is enabled is displayed. In the illustrated example, the switch SW is in a state where the extraction review mode is enabled. By moving a slider SD2 to the left and right, capture images are switched and displayed page by page without duplicating capture images on the same page. Further, marks (scales) corresponding to capture images as review targets in the extraction review mode are displayed below a slider bar of the slider SD2. Note that, when the extraction review mode is disabled in the switch SW, all capture images stored in a folder become review targets.

Further, in the present embodiment, a data file in which only one capture image for one page is collected can be generated.

The configuration of an information processing apparatus according to the present embodiment will be described in detail below. Since the appearance and hardware configuration of the information processing apparatus according to the present embodiment are the same as those illustrated in FIG. 1 and FIG. 4, the description thereof will be omitted. Here, a functional configuration different from that of the first embodiment will be described.

Figures 11, 12:
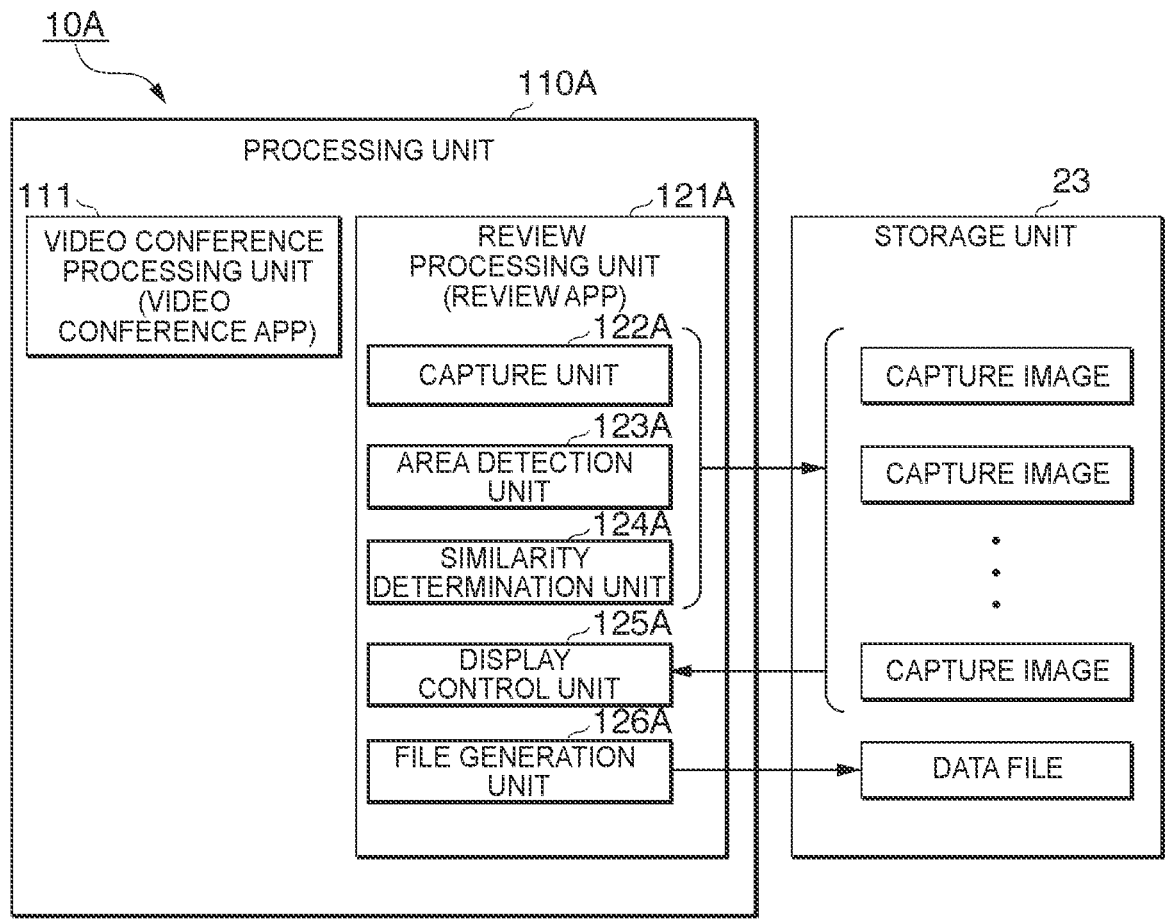
FIG. 11 is a block diagram illustrating an example of the functional configuration of an information processing apparatus according to the second embodiment.
FIG. 12 is a table illustrating an example of capture image files according to the second embodiment.

FIG. 11 is a block diagram illustrating an example of the functional configuration of an information processing apparatus 10A according to the present embodiment. In FIG. 11, components corresponding to respective units illustrated in FIG. 5 are given the same reference numerals. The information processing apparatus 10A includes a processing unit (or a processor) 110A as a functional component implemented by the CPU 11 executing various programs. The processing unit 110A includes the video conference processing unit 111 and a review processing unit 121A. The video conference processing unit 111 is a functional component implemented by executing the video conference app, which is the same as the video conference processing unit 111 illustrated in FIG. 5. The review processing unit 121A is a functional component implemented by executing the review app according to the present embodiment. The review processing unit 121A includes a capture unit 122A, an area detection unit 123A, a similarity determination unit 124A, a display control unit 125A, and a file generation unit 126A.

Upon capturing a picture of the video conference app, the capture unit 122A captures a content area detected by the area detection unit 123A.

The area detection unit 123A detects a content area of a material from the picture of the video conference app by performing image analysis. As an image analysis method, any method such as edge detection can be used.

The similarity determination unit 124A compares a capture image captured this time with a capture image previously captured each time a capture image is captured by the capture unit 122A to determine a similarity. For the determination of the image similarity, any determination method such as image pattern matching can be used. For example, the similarity determination unit 124A determines a degree of similarity between the capture image captured this time and the capture image previously captured. Then, when determining that the degree of similarity is a predetermined threshold value or more, the similarity determination unit 124A gives an exclusion flag indicative of exclusion from review targets to file information of the capture image captured this time.

FIG. 12 is a table illustrating an example of capture image files stored in the storage unit 23 according to the present embodiment. In the example illustrated in FIG. 12, the file name of each capture image file, the time stamp, and the exclusion flag are illustrated. For example, the time stamp is included in header information of the capture image file. The exclusion flag is stored in association with the capture image file. For example, the exclusion flag is set to "0" by default to indicate that the capture image file is not excluded from review targets. When giving the exclusion flag indicative of exclusion from review targets to a capture image file to be excluded from review targets, the similarity determination unit 124A changes the exclusion flag from "0" to "1."

The display control unit 125A excludes, from review targets (display targets), a capture image whose degree of similarity to the capture image previously captured is determined by the similarity determination unit 124A to be the predetermined threshold value or more. For example, the display control unit 125A reads a file without the exclusion flag given thereto among capture image files stored in the storage unit 23. Then, the display control unit 125A displays a capture image of the read capture image file in the window WR of the review app illustrated in FIG. 10.

The file generation unit 126A generates, as one data file, each of a series of capture images captured by the capture unit 122A and allocated page by page in capture order, respectively. For example, the file generation unit 126A generates, as one data file, remaining capture images after capture images whose degrees of similarity to the capture image previously captured are determined by the similarity determination unit 124A to be the predetermined threshold value or more are excluded in a manner to be allocated page by page in capture order. Specifically, the file generation unit 126A reads files to which the exclusion flag is not given among the capture image files stored in the storage unit 23, and generates, as one data file, capture images of the read files allocated page by page in capture order. This data file is also called a "slide file" below because the material can be displayed page by page in a slide display.

Further, the file generation unit 126A can generate the slide file based on capture images captured by then while continuing the capture by the capture unit 122A every predetermined time during the running of the video conference app. Note that the file generation unit 126A can also generate the slide file based on the capture images stored in the folder after the end of the capture.

Next, the operation of review processing executed by the review processing unit 121A according to the present embodiment will be described. The review processing according to the present embodiment is basically the same as the review processing illustrated in FIG. 7, but different in the details of the capture processing in step S103 and in that only capture images without the exclusion flag given thereto become review targets in step S105 and step S107. Here, the details of the capture processing in step S103 will be described with reference to FIG. 13.

Figure 13:
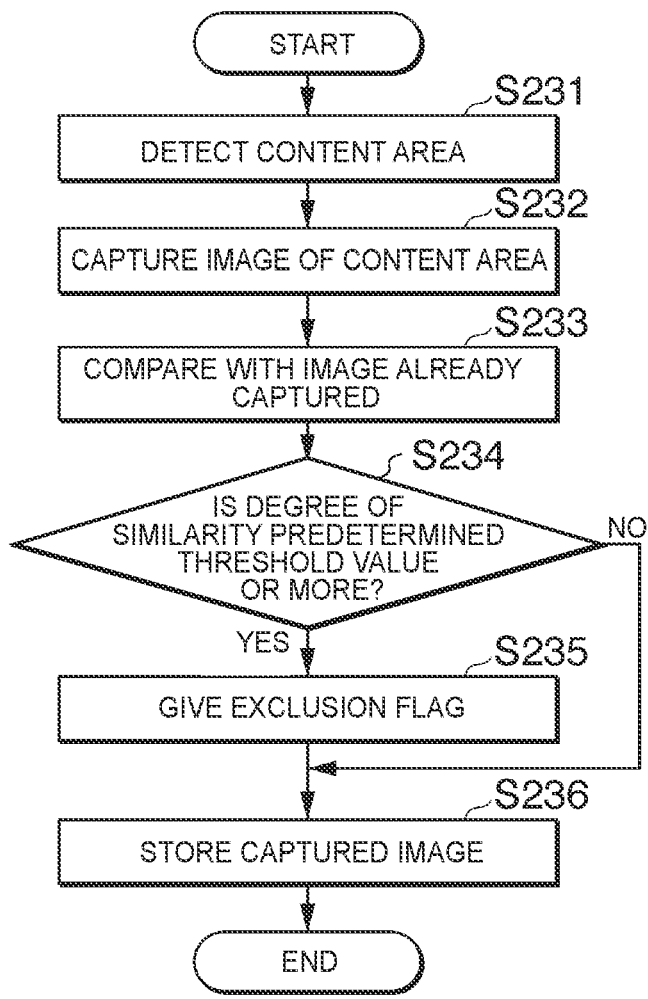
FIG. 13 is a flowchart illustrating an example of capture processing according to the second embodiment.

FIG. 13 is a flowchart illustrating an example of capture processing according to the present embodiment.

(Step S231) The review processing unit 121A performs image analysis to detect a content area of a material from a picture of the video conference app.

(Step S232) The review processing unit 121A captures an image of the content area detected in step S231.

(Step S233) The review processing unit 121A compares the image captured in step S232 (the capture image captured this time) with a capture image (a capture image previously captured) stored in the storage unit 23. For example, the review processing unit 121A compares the image captured in step S232 with a capture image last captured among capture images without the exclusion flag given thereto and stored in the storage unit 23. Note that the review processing unit 121A may also compare the image captured in step S232 with all of the capture images without the exclusion flag given thereto and stored in the storage unit 23.

(Step S234) Based on the comparison result in step S232, the review processing unit 121A determines the similarity between the image captured in step S232 and the capture image previously captured. For example, the review processing unit 121A determines whether or not a degree of similarity between the image captured in step S232 and the capture image previously captured is the predetermined threshold value or more. When determining that the degree of similarity is the predetermined threshold value or more (YES), the review processing unit 121A proceeds to a process in step S235. On the other hand, when determining that the degree of similarity is less than the predetermined threshold value (NO), the review processing unit 121A proceeds to a process in step S236 without performing the process in step S235.

(Step S235) The review processing unit 121A gives the exclusion flag to the image captured in step S232. For example, the review processing unit 121A sets the exclusion flag of the capture image file captured in step S232 to "1."

(Step S236) The review processing unit 121 stores, in the storage unit 23, a file (capture image file) of the image captured in step S232. Then, the procedure proceeds to the process in step S105 of FIG. 7.

Next, the operation of slide file generation processing executed by the review processing unit 121A according to the present embodiment will be described.

Figure 14:
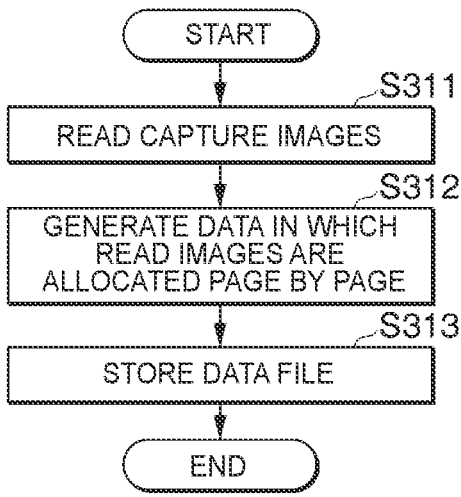
FIG. 14 is a flowchart illustrating an example of slide file generation processing according to the second embodiment.

FIG. 14 is a flowchart illustrating an example of slide file generation processing according to the present embodiment.

(Step S311) The review processing unit 121 reads capture image files stored in the storage unit 23. For example, the review processing unit 121 reads review target files (files with the exclusion flag set to "0") among capture image files stored in the storage unit 23.

(Step S312) The review processing unit 121 generates one data file in which images of the capture image files read in step S311 are allocated page by page in capture order.

(Step S313) The review processing unit 121 stores the data file generated in step S312 in the storage unit 23 as a slide file of the material.

As described above, the information processing apparatus 10A according to the present embodiment may detect a content area (an example of a specific area) of a material from a picture by performing image analysis on the picture received from any other terminal device using the video conference app to capture the content area detected from among screen areas of the display unit 14.

Thus, although the display size of the window WR becomes small in the information processing apparatus 10A when the user views both the window WV of the video conference app and the window WR of the review app, since the material can be displayed over the entire window area of the window WR, the small window area can be used effectively to make it easier to view the material. Therefore, the information processing apparatus 10A can improve the convenience of the online video conference.

Note that the information processing apparatus 10A may also allow the user to perform an operation so as to specify a content area to be captured. Thus, when the content area cannot be detected correctly by image analysis depending on the content of the material, since the user can manually set the content area, the information processing apparatus 10A is convenient.

Further, the information processing apparatus 10A compares an image of a capture image file captured this time with an image of a capture image file previously captured each time an image is captured to determine the similarity therebetween. Then, the information processing apparatus 10A excludes, from review targets (display targets) to be displayed on the display unit 14, an image of a capture image file whose degree of similarity to the image of the capture image file previously captured is determined to be the predetermined threshold value or more.

Thus, since only one capture image becomes a review target for one page without duplicating capture images on the same page, the information processing apparatus 10A can make page turning easier for the user to review the material. Therefore, the information processing apparatus 10A can improve the convenience of the online video conference.

Further, the information processing apparatus 10A generates, as one slide file (an example of a data file), images of a captured series of capture images allocated page by page in capture order, respectively.

Thus, since the slide file of the material can be generated from the capture images without getting the material used at the video conference from the presenter, the information processing apparatus 10A is convenient.

For example, the information processing apparatus 10A generates, as one slide file, images of remaining capture image files after capture image files whose degrees of similarity to the image of the capture image file previously captured are determined to be the predetermined threshold value or more are excluded from the captured series of capture image files in a manner to be allocated page by page in capture order.

Thus, since the slide file can be generated by collecting an image each time the page is changed not to duplicate the same page when the slide file of the material is generated from the capture images, the information processing apparatus 10A is convenient.

Further, the information processing apparatus 10A generates one slide file based on images of captured capture image files while continuing the capture every predetermined time during the running of the video conference app.

Thus, since the slide file including the material up to the page displayed by then can be generated even in the middle of the video conference, the information processing apparatus 10A is convenient.

In the present embodiment, the example in which the content area detected by the area detection unit 123A is captured when the capture unit 122A captures a picture of the video conference app is described, but the present invention is not limited to this example. For example, instead of capturing the content area, the capture unit 122A may also capture the full screen area of the display unit 14, the window area of the video conference app, or a screen area specified by the user to store, in the storage unit 23, the captured capture image file in association with information indicative of the content area detected by the area detection unit 123A (for example, rectangle information indicative of the content area). Then, the similarity determination unit 124A may cut out content areas respectively from the capture image captured this time by the capture unit 122A and the capture image previously captured to compare the content areas in order to determine the similarity therebetween. Further, the display control unit 125A may cut out a content area from the capture image of the read capture image file to display the content area in the window WR of the review app illustrated in FIG. 10. Further, the file generation unit 126A may generate, as one slide file (data file), content areas respectively cut out from the series of capture images captured by the capture unit 122A and allocated page by page in capture order.

Further, in addition to capturing still images, the capture unit 122A may also capture a video. For example, the capture unit 122A may capture the video together with capturing the still images during a period corresponding to a period from the start of capturing the still images to the end of the capture. Further, after the end of capturing the video, the capture unit 122A may capture still images (frame images of the video) from the captured video. Then, after the end of capturing the video, the file generation unit 126A may generate a slide file (data file) based on capture images of the still images from the video captured by the capture unit 122A.

While the embodiments of this invention have been described in detail above with reference to the accompanying drawings, the specific configurations are not limited to those described above, and various design changes can be made without departing from the scope of this invention. For example, the configurations described in the respective embodiments mentioned above may be combined arbitrarily.

In the aforementioned embodiments, the example of capture every 10 seconds is described as the example of capture every predetermined time is described, but the present invention is not limited to this example. For example, there may also be a configuration of capture every second or every minute. Further, this timing of capture may be preset, or may be able to be set arbitrarily by the user.

Further, the information processing apparatus 10 (10A) captures a screen area of the display unit 14. Therefore, in the aforementioned embodiments, the description is made by taking the video conference app as an example of an application to be a capture target (a target for the review app), but the type of video conference app is not limited in any way. Further, the application is not limited to the application for video conference, and the aforementioned embodiments can be applied to any other application capable of communication including video communication with other terminal devices through the network. In other words, the capture targets can be any application and content as long as they are displayed on the display unit 14.

Further, the information processing apparatus 10 (10A) described above has a computer system therein. Then, a program for implementing the function of each component included in the information processing apparatus 10 (10A) described above may be recorded on a computer-readable recording medium so that the program recorded on this recording medium is read into the computer system and executed to perform processing in each component included in the information processing apparatus 10 (10A) described above. Here, the fact that "the program recorded on the recording medium is read into the computer system and executed" includes installing the program on the computer system. It is assumed that the "computer system" here includes the OS and hardware such as peripheral devices and the like. Further, the "computer system" may include two or more computers connected through a network including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 10 (10a), or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the above-described functions of the information processing apparatus 10 (10A) in each of the above described embodiments may be realized as an integrated circuit such as LSI (Large Scale Integration). Each of the functions may be Implemented as a processor individually, or part or the whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, in the embodiments described above, the example in which the information processing apparatus 10 (10A) is the laptop PC is described, but the information processing apparatus 10 (10A) may also be a desktop PC or a tablet PC, or a smartphone or a game console, or an electronic device dedicated for video conferences. Further, the imaging unit 27 is not limited to that built in the information processing apparatus 10, and the imaging unit 27 may also be a peripheral device connected by USB (Universal Serial Bus) or the like. Further, the display unit 14 is not limited to that built in the information processing apparatus 10, and the display unit 14 may be a peripheral device connected by HDMI (registered trademark) or USB.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

10, 10A information processing apparatus
101 first chassis
102 second chassis
103 hinge mechanism
11 CPU
12 main memory
13 video subsystem
14 display unit
21 chipset
22 BIOS memory
23 storage unit
24 audio system
25 communication unit
26 USB connector
27 imaging unit
31 embedded controller
32 keyboard
33 power supply circuit
34 battery
35 sensor
110, 110A processing unit
111 video conference processing unit
121, 121A review processing unit
122, 122A capture unit
123A area detection unit
124A similarity determination unit
125, 125A display control unit

The invention claimed is:

1. An information processing apparatus that executes an application for transmitting and receiving video and voice to and from another information processing apparatus through a network, comprising:
  a processor that:
    captures a screen area including at least a part of a picture among screen areas of a display in which the picture received from the other information processing apparatus using the application is displayed, as a still image file every predetermined time;
    displays, on the display, at least a part of images of a series of captured still image files while continuing the capture every predetermined time during the running of the application; and generates, as one data file, each of images of the series of captured still image files that are allocated page by page in a capture order.

2. The information processing apparatus according to claim 1, wherein
the processor:
displays, on the display, a user interface used to make each of the series of captured still image files selectable correspondingly in a capture order, and
displays, on the display, an image of a still image file selected based on an operation to the user interface.

3. The information processing apparatus according to claim 1, wherein the processor captures a full screen area of the display.

4. The information processing apparatus according to claim 1, wherein the processor captures a window area of the application in which the picture is displayed among the screen areas of the display.

5. The information processing apparatus according to claim 1, wherein the processor captures a part of an area specified from among the screen areas of the display.

6. The information processing apparatus according to claim 1, wherein
the processor:
detects a specific area from the picture by performing image analysis on the picture, and
captures the detected specific area from among the screen areas of the display.

7. An information processing apparatus that executes an application for transmitting and receiving video and voice to and from another information processing apparatus through a network, comprising:
a processor that:
captures a screen area including at least a part of a picture among screen areas of a display in which the picture received from the other information processing apparatus using the application is displayed, as a still image file every predetermined time;
displays, on the display, at least a part of images of a series of captured still image files while continuing the capture every predetermined time during the running of the application;
compares an image of a still image file captured this time with an image of a still image file previously captured each time the image is captured and determines a similarity; and
excludes, from a display target to be displayed on the display, an image of a still image file whose degree of the similarity to the image of the still image file previously captured is determined to be a predetermined threshold value or more.

8. The information processing apparatus according to claim 1, wherein
the processor:
compares an image of a still image file captured this time with an image of a still image file previously captured each time the image is captured and determines a similarity, and
generates, as one data file, remaining still image files after still image files whose degrees of the similarity to the image of the still image file previously captured are determined to be the predetermined threshold value or more are excluded from the series of still image files, in a manner to be allocated page by page in the capture order.

9. The information processing apparatus according to claim 1, wherein
the processor generates the one data file based on images of captured still image files while continuing the capture every predetermined time during the running of the application.

10. The information processing apparatus according to claim 1, wherein the processor starts the capture when detecting that the application has occupied a microphone or a speaker.

11. The information processing apparatus according to claim 10, wherein the processor ends the capture when determining that the application has released the microphone or the speaker.

12. A control method for an information processing apparatus that executes an application for transmitting and receiving video and voice to and from another information processing apparatus through a network, the control method comprising:
capturing a screen area including at least a part of a picture among screen areas of a display in which the picture received from the other information processing apparatus using the application is displayed, as a still image file every predetermined time;
displaying, on the display, at least a part of images of a series of captured still image files while continuing the capture every predetermined time during the running of the application; and
generating, as one data file, each of images of the series of captured still image files that are allocated page by page in a capture order.

* * * * *